(12) United States Patent
Goeller et al.

(10) Patent No.: US 7,237,137 B2
(45) Date of Patent: Jun. 26, 2007

(54) AUTOMATIC CLASSIFICATION OF EVENT DATA

(75) Inventors: Sunni K. Goeller, Redmond, WA (US); Edward Reus, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 568 days.

(21) Appl. No.: 10/860,633

(22) Filed: Jun. 30, 2004

(65) Prior Publication Data

US 2005/0066236 A1    Mar. 24, 2005

Related U.S. Application Data

(63) Continuation of application No. 09/865,167, filed on May 24, 2001, now Pat. No. 6,898,737.

(51) Int. Cl.
*G06F 11/00* (2006.01)
(52) U.S. Cl. .................................................. 714/1
(58) Field of Classification Search ................ 714/1, 714/39, 47
See application file for complete search history.

(56) References Cited

U.S. PATENT DOCUMENTS

| | | | | |
|---|---|---|---|---|
| 5,764,904 A | * | 6/1998 | Kurashima | 709/208 |
| 6,647,432 B1 | * | 11/2003 | Ahmed et al. | 719/318 |
| 6,999,992 B1 | * | 2/2006 | Deen et al. | 709/206 |

* cited by examiner

*Primary Examiner*—Nadeem Iqbal
(74) *Attorney, Agent, or Firm*—Christensen O'Connor Johnson Kindness PLLC

(57) ABSTRACT

A method and computer-readable medium for providing electronic support and assistance from a server to a client are disclosed. An agent residing on the client monitors events requiring support, such as faults and error messages. When an event requiring support occurs, the client agent collects data associated with the event, formulates a message, and transmits the message to the server. The server applies the event data to support vector machines that classify the data into categories and produce probability scores for each category. Category probability scores that exceed a threshold value cause the server to formulate and transmit a response containing category-specific resolution information to the client. When no matching categories are identified, the response so indicates. After receiving the response, the client automatically provides support to resolve the event.

40 Claims, 8 Drawing Sheets

AUTOMATIC CLASSIFICATION OF EVENT DATA

CROSS-REFERENCE TO RELATED APPLICATION

This application is a continuation of U.S. patent application Ser. No. 09/865,167, filed May 24, 2001 now U.S. Pat. No. 6,898,737.

FIELD OF THE INVENTION

This invention generally relates to the field of computer software, and more specifically, to a system and method of providing electronic support and assistance from a server to a client.

BACKGROUND OF THE INVENTION

The growth in software applications and computer hardware components, not only in terms of volume, but also in terms of complexity and diversity, continues to rapidly accelerate. At the same time, the number of computer users is quickly increasing. The ability of vendors to provide support and assistance to computer users is a matter of significant concern. Current user support typically consists of a user calling a helpdesk for human assistance. Unfortunately, the current process of primarily relying upon human intervention for providing user assistance is not meeting the growing demand for support.

Oftentimes, a computer user is at the client end of a network, which could be a local area network, intranet, or the Internet. The computer user at the client site may encounter many different text messages produced by a wide variety of events, many of which require support. Error messages and support requests are common examples of event messages occurring at the client machine that require support. In this scenario, where the user is remote from the physical location of the human assistant, the information available to the user and, thus, the human assistant, is very limited, consisting of the text message associated with the event.

Presently, in a client/server setting, event messages are stored as text strings on the client. In the vast majority of cases, these text strings lack a unique identifier. As a result, computer programs are unable to determine the source of the event that may require support. For instance, the error message "insufficient memory" could stem from many different sources. Generally, event messages are now being handled in an inflexible rule-based manner, in which every character in each message must be exactly known, accounted for and stored in a file along with the appropriate action to be taken for that particular message.

Accordingly, there exists a need to improve user support and assistance, while at the same time reducing the need for human intervention when providing user support and assistance. The current processes for handling event messages that require support have many flaws. Most notably, the current processes often fail to provide a user or a remote human assistant with a sufficient amount of diagnostic information, i.e., an amount of diagnostic information adequate to quickly identify and resolve a problem. The current processes also require labor-intensive development and testing. Additionally, the current processes use large quantities of memory and other resources at the client site. The present invention is directed to fulfilling this need.

As will be better understood from the following description, the present invention employs a classifier for classifying textual informational objects. While there exist many different ways to classify text, the present invention uses a support vector machine, a known text classifier, to classify textual information. Brief descriptions of text classifiers in general and of text classification using support vector machines specifically, are provided below. For a more detailed description of support vector machines, attention is directed to U.S. patent application Ser. No. 09/102,946, filed Jun. 23, 1998, entitled "Methods and Apparatus For Classifying Text and For Building A Text Classifier", by inventors Susan T. Dumais, John C. Platt, David E. Heckerman, Mehran Sahami, and Eric J. Horvitz, and commonly assigned.

One way textual informational objects can be classified is manually, by trained professionals. However, manual text classification is very time consuming and costly. Therefore, this approach is often impractical. Consequently, ways to automate text classification have been developed. In some cases, rule-based approaches are used when objects must be classified with absolute certainty. However, rule-based methods also are limited due to the fact that they generally require manual construction of the rules, make rigid binary decisions about category membership, and are typically difficult to modify.

Another strategy is to use inductive learning techniques to automatically construct classifiers. Inductively learned classifiers are trained using labeled training data, consisting of examples of items that are in each category, and also may include examples of data specifically not in a given category. Weights are assigned to terms or features of an item to represent the importance or relevance of that term to a category. The weights can be adjusted during training until the classifier performs optimally. A separate classifier is trained or learned for each category. All classifiers output a graded measure of category membership, so different thresholds can be set to favor precision or recall depending on the application. New items are classified by computing a score and comparing the score with a learned threshold. New items exceeding the threshold are considered as belonging to the category.

The resulting learned text classifiers have many advantages. For instance, inductively learned text classifiers are easy to construct and update, since they depend only on information that is easy for people to provide, namely, examples of items that are in or out of categories. Inductively learned text classifiers can also be customized to specific categories of interest to individuals to allow users to easily trade off precision and recall depending on their task. Inductively learned classifiers are easy to construct and update since they require only subject knowledge and not programming or rule-writing skills. Several inductively learned classifiers are presently known to those skilled in the art, such as neural networks, Bayesian networks, and support vector machines.

Support vector machines have been found to be more accurate at text classification than Bayesian networks. (Joachims, "Text Categorization with Support Vector Machines: Learning with Many Relevant Features", LS-8 Report 23, University of Dortmund Computer Science Department (November 1997).) Although support vector machines are known to those skilled in the art, a brief description of the general idea behind support vector machines follows.

Generally, an object to be classified by support vector machines may be represented by a number of features. If, for example, the object to be classified is represented by two features, it may be represented by a point in two-dimensional space. Similarly, if the object to be classified is represented by n features, also referred to as a "feature vector", it may be represented by a point in n-dimensional space. The simplest form of a support vector machine defines a plane in the n-dimensional space, also known as a hyperplane, which separates feature vector points associated with objects "in a class" from feature vector points associated with objects "not in the class." For example, referring to FIG. 1, hyperplane 22 separates feature vector points, denoted by circles 28, associated with objects "in a class" from feature vector points, denoted by squares 30, associated with objects "not in a class." A number of classes can be defined by defining a number of hyperplanes. The hyperplane defined by a trained support vector machine is the plane that maximizes the distance from the plane to the closest points, also referred to as support vectors, "in the class" and "not in the class." Thus, the hyperplane lies equidistant from the closest points (support vectors) "in the class" and "not in the class." Referring again to FIG. 1, the "in the class" support vector 24 and the "not in the class" support vector 26 are both located at a distance "d" from the hyperplane 22. The hyperplane that maximizes the distances "d" is sought, because the support vector machine defined by such a hyperplane is robust to input noise.

SUMMARY OF THE INVENTION

The present invention is directed to alleviating the previously described problems with current user support and assistance and at the same time to reducing the reliance on human intervention for user support and assistance by providing a method and system for electronically providing support and assistance from a server to a client.

Generally described, an embodiment of the present invention includes a client connected to a network, which can be a local area network, an intranet, or the Internet. Typically, the client will generate various event data messages that require support. Usually, the user at the client site will want to report the event requiring support in order to receive assistance. Included in the present invention is an agent residing on the client that recognizes the occurrence of an event requiring support. Upon the occurrence of an event requiring support and the authorization of the user to report the event to the server, the client resident agent collects data associated with the event and transmits a message containing the event data to the server.

The server then receives and stores the event data contained in the message from the client. The server applies the event data to a trained set of support vector machines that classifies the event data. After classifying the event data, the trained set of support vector machines returns category probability scores. The category probability scores approximate how well the event data fits into one or more categories. The server uses the category probability scores to determine whether the event data should be identified as belonging to one or more categories. In an actual embodiment of the present invention, the category is identified as matching the event data by comparing the category probability score with a threshold value. If the category probability exceeds the threshold value, the event data is identified as matching the category. Another embodiment of the present invention utilizes multiple threshold values to identify matching categories to which the event data belongs.

According to the present invention, the server formulates a response based on the results of the support vector classification of the event data and the identification of matching categories. If one or more matching categories are identified, the server formulates a response containing resolution information based upon the one or more matching categories. According to one embodiment of the present invention, formulating the response includes prioritizing the matching categories in order of highest to lowest probability of causing the event requiring support. If no matching categories were identified, the server formulates a response indicating this fact. After formulating the appropriate response, the server transmits the response to the client.

Finally, the client receives the response containing resolution information specific to the identified matching category. If the resolution requires user action, the client generates instructions in user-understandable terms. In accordance with one embodiment of the present invention, the response may also contain a software update or a change to the system settings to resolve the event requiring support. According to different embodiments of the present invention, one or more of these remedies may be included in the response. Thus, the user receives assistance electronically, without necessitating a call to product support. Further, even if the automatic classification fails to identify a resolution, the event information gathered by the client can aid follow-up support and assistance performed by human intervention.

The present invention further provides a computer-readable medium for providing electronic support and assistance from a server to a client.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to providing a method and computer-readable medium for providing electronic support and assistance from a client to a server. An illustrative embodiment of the present invention is described in detail below.

Figure 2:
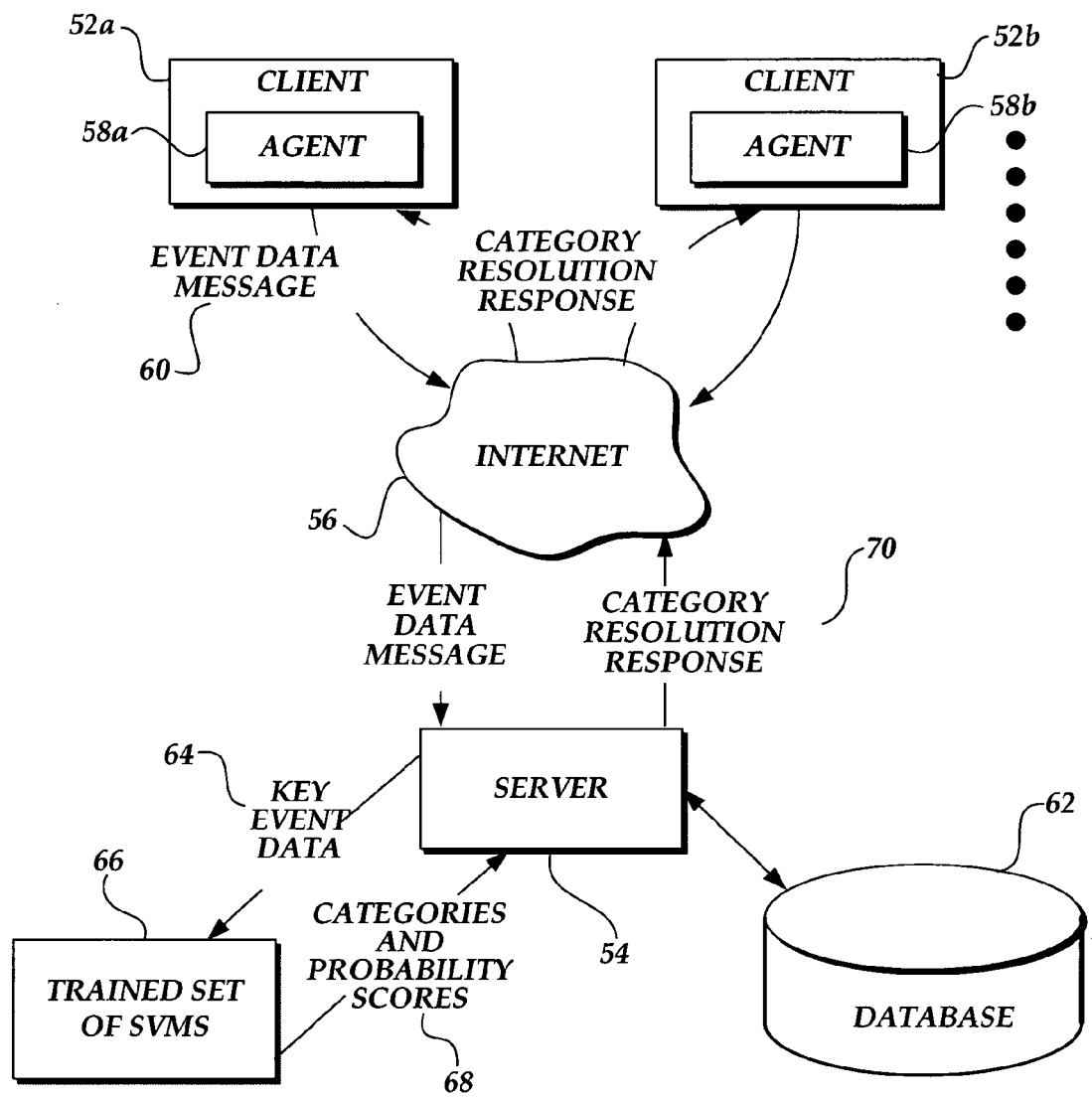
FIG. 2 is a block diagram illustrating a client/server architecture and general operation of an actual embodiment of the present invention.

Referring now to the figures, a representative operating environment for an actual embodiment of the present invention is illustrated by FIG. 2. The operating environment shown in FIG. 2 is only one example of a suitable operating environment and is not intended to suggest any limitation as to the scope of use or functionality of the invention. Neither should the operating environment be interpreted as having any dependency or requirement relating to any one or a combination of components illustrated in the exemplary operating environment.

While the illustrated embodiment of the invention is implemented using the Internet 56, it is to be understood that other embodiments of the present invention could be implemented on other types of environments known to those skilled in the relevant art, such as a local area network, a wide area network, a peer-to-peer network, and a stand-alone system. The present invention may be implemented utilizing any combination of two or more components that are able to communicate through any type of communications link known to those skilled in the art.

As is well known to those skilled in the art, the term "Internet" refers to the collection of networks and routers that use the Transmission Control Protocol/Internet Protocol ("TCP/IP") to communicate with one another. At the heart of the Internet is a backbone of high-speed data communication lines between major nodes or host computers, consisting of thousands of commercial, government, educational, and other computer systems, that route data and messages. A user generally accesses or connects to the Internet in one of two ways. The first is through a dialing up of an Internet service provider or an online information services provider via a modem connected to the user's computer. This method is the one used by the majority of home computer users. The second way is through a dedicated line, such as a T1 carrier, that is connected to a local area network, to which, in turn, the user's computer is connected. The dedicated line solution is used by larger organizations, such as corporations, which either have their own node on the Internet or connect to an Internet service provider that is a node.

In an actual embodiment of the present invention, client components 52a, 52b, . . . 52n and a server component 54 (also called clients and servers) are connected to the Internet 56. As shown in FIG. 2, the server component 54 represents a computer or program that responds to commands from a client component. For example, a file server may contain an archive of data or program files, when a client submits a request for a file, the server transfers a copy of the file to the client. As shown in FIG. 2, the client components 52a, 52b, . . . 52n represent computers or programs that accesses shared network resources provided by another computer or program (called a server).

As stated previously, another embodiment of the invention may be implemented using a local area network (LAN), and the server component would then be a computer running administrative software that controls access to the network and its resources, such as printers and disk drives, and provides resources to computers functioning as workstations on the network. In yet another embodiment, the present invention may be implemented using an intranet. An intranet is a private network based on Internet protocols such as TCP/IP but designed for information management within a company or organization. An intranet is so called because it looks like a World Wide Web site and is based on the same technologies, yet is strictly internal to the organization and is not connected to the Internet proper.

Again, the present invention is not limited to any one particular type of environment or network and may be implemented using one or more local area networks, wide area networks, peer-to peer networks, intranet, the Internet or any other type of network or stand-alone system where the client components 52a, 52b, . . . 52n access shared network resources provided by the server component 54.

In an actual embodiment of the present invention, the client components 52a, 52b, . . . 52n of the present invention are complete, stand-alone personal computers, such as desktop personal computers, portable computers, and notebook computers. Additionally, other embodiments of the present invention may be implemented where client components consist of any combination of one or more of the personal computers described above, as well as cellular phones, digital cameras, handheld personal digital assistants, or any other portable electronic device, including those using wireless technology.

In one embodiment of the present invention the server component 54 of the present invention is a complete, stand-alone personal computer, such as a desktop personal computer, a portable computer, or a notebook computer. In another embodiment of the present invention the server component 54 is a large computer designed to handle extensive computational tasks such as mainframe computer. In yet another embodiment of the present invention the server component 54 is a mid-level computer, such as mainframe computer.

According to an actual embodiment of the present invention, agents 58a, 58b, . . . 58n reside on client components 52a, 52b, . . . 52n, respectively. As is well known to those of ordinary skill in the art, an agent is a program that performs a background task for a user and reports to the user when the task is done or when some expected event has taken place. A program is a sequence of instructions that can be executed by a computer. In an actual embodiment of the present invention, agents 58a, 58b, . . . 58n are client resident programs that recognize the occurrence of events that require support, collect data associated with the event requiring support and transmit messages 60 containing the event data 60 to the server component 54.

In an actual embodiment of the present invention, agents 58a, 58b, . . . 58n are implemented as part of the operating system residing on the respective client components 52a, 52b, . . . 52n. As is well known in the art, an operating system is the software that controls the allocation and usage of hardware resources such as memory, central processing unit (CPU) time, disk space, and peripheral devices. The operating system is the foundation software on which applications depend. Popular operating systems include Windows 98 and Windows NT, which are owned and licensed by Microsoft Corporation of Redmond, Wash. The protected mode offered in the 80286 and higher microprocessors provides the memory management and memory protection needed for multitasking environments, such as that provided by the Windows 98 operating system produced by Microsoft.

By embodying at least part of an agent in the operating system of the client component, the agent has the ability to handle operating system faults that would otherwise not be possible, due to lack of access to memory protected by the operating system. According to the present invention, where the agent is part of the operating system, the agent recognizes events requiring support as the occurrence of an error message, a kernel mode fault (also known as a blue screen), a device error, a user mode application fault, an application incompatibility issue, an access denied to file/share/directory, a spontaneous reboot, an abnormal shutdown, a logon failure, a hung application, low resource, a defragmentation error, a disk check error, an application installation failure, and low disk space. Of the above-listed events requiring support as recognized by an embodiment of the present invention, the kernel mode fault and the abnormal shutdown necessitate that a portion of the agent be embedded in the operating system. A kernel mode fault is a fault or crash of the core operating system, which is the portion of the system that manages memory, files, and peripheral devices, maintains the time and date, launches applications, and allocates system resources.

However, in other embodiments of the present invention, a client agent may be implemented as a stand-alone program that communicates with the operating system via an interface. When implemented using a stand-alone client agent, the present invention handles events requiring support that are not operating system faults, such as faults or errors concerning unprotected memory resources, various devices, and application programs associated with the client component on which the stand-alone agent resides.

From the client components 52a, 52b, . . . 52n, the server component 54 receives the event data messages 60 requiring support and stores the event data messages 60 requiring support in a database 62. A database is a file composed of records, each containing fields together with a set of operations for searching, sorting, recombining, and other functions. Many different types of databases exist, some of which include hierarchical databases, object-oriented databases and relational databases. One embodiment of the present invention uses a hierarchical database, while another embodiment uses an object-oriented database.

A hierarchical database is a database in which records are grouped in such a way that their relationships form a branching, treelike structure. The hierarchical database structure is well suited for organizing information that breaks down logically into successively greater levels of detail. The organization of records in a hierarchical database should reflect the most common or the most time-critical types of access expected. An object-oriented database is flexible and supports the use of abstract data types, objects, and classes and can store a wide range of data, often including sound, video, and graphics, in addition to text and numbers. Some object-oriented databases allow data retrieval procedures and rules for processing data to be stored along with the data or in place of the data. This allows the data to be stored in areas other than in the physical database, which is often desirable when the data files are large, such as those for video files. One skilled in the relevant art will readily appreciate that different types of databases may be practiced with the present invention.

Event data messages 60 requiring support stored in the database 62 are extracted from the database 62 by the server component 54, manipulated to eliminate data (stop words) to be ignored during classification and the result, called key event data 64, applied to a trained set of support vector machines (SVMs) 66. For ease of understanding, while actually an application program run by the server component 54, the trained set of SVMs are shown as a separate block in FIG. 2. Support vector machines are well known to those of ordinary skill in the art and will be discussed in greater detail below. A support vector machine is one type of learned text classifiers. Learned text classifiers are text clustering algorithms used to automate classification of textual informational objects and are capable of being trained using labeled training data. The set of trained support vector machines 66 identifies the categories and produces probability scores 68 that are used by the present invention to determine the category or categories, if any, within which the event requiring support likely falls. When the probability score of a category exceeds a threshold value, the event requiring support is considered as being within the associated category. It will be readily understood by one skilled in the relevant art that the present invention may be practiced with more than one threshold value. One skilled in the relevant art will also readily understand that the present invention may be practiced with a single default threshold value and multiple alternate threshold values, which may be lower or higher, for specific categories having special match requirements.

The server component 54 formulates a response 70 containing resolution information based on the matching category or categories identified as having an associated probability score above a threshold value. In one embodiment of the invention, when multiple matching categories are identified, the response formulated by the server component 54 is prioritized so that the matching categories are in order of highest to lowest probability. When no categories are found to match the event requiring support, the server component 54 formulates a response based upon this scenario.

The server component 54 formulates and transmits a response 70 containing resolution information based on the matching category to the appropriate client components 52a, 52b, . . . 52n. The designated client components 52a, 52b, . . . 52n receive the resolution information response 70 based on the matching category from the server component 54. If the resolution requires user action, the client generates instructions in user-friendly terms. In accordance with one embodiment of the present invention, the response may also contain a software update or a change to the system settings to resolve the problem. According to different embodiments of the present invention, one or more of these remedies may be included in the response. Thus, the user at the client receives relevant support and assistance electronically without relying upon human intervention.

Figure 3:
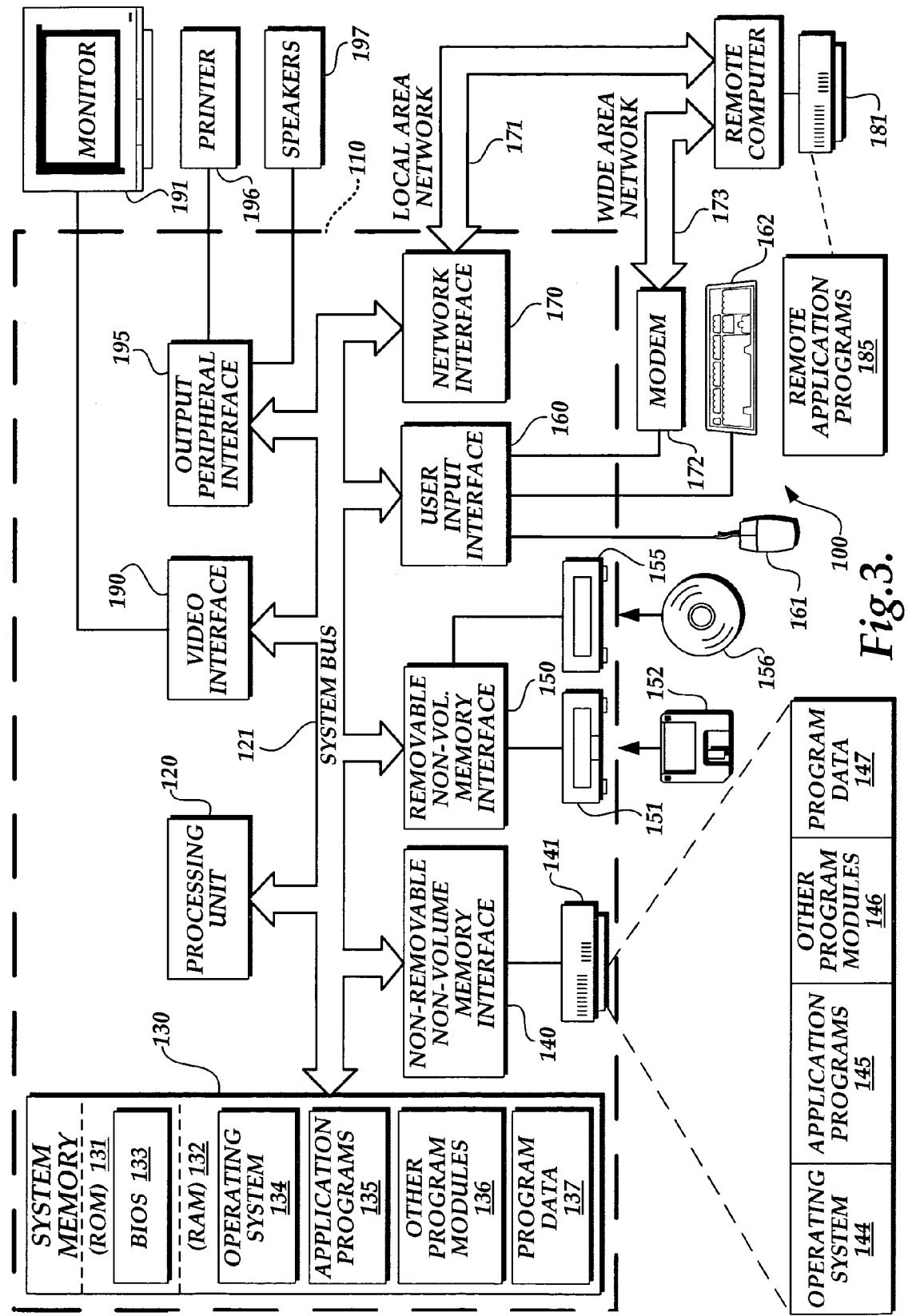
FIG. 3 is a block diagram illustrating an example of a computer suitable for forming the client(s) and/or the server of FIG. 2.

As mentioned previously, both the client components 52a, 52b, . . . 52n and the server component 54 may be personal computers. A representative personal computer is illustrated in FIG. 3. According to the present invention, the client and server components work together to provide electronic support and assistance from a server component to a user at a client component site. Thus, the client portion of the invention is typically optimized for user interaction, whereas the server portion provides the centralized, multi-user functionality. The invention may be described in the general context of computer-executable instructions, such as program modules, being executed by a computer, such as the personal computer illustrated in FIG. 3. Generally, program modules include routines, programs, objects, components, data structures, etc., that perform particular tasks or implement particular abstract data types.

The many components of a personal computer system that the client and server may consist of are illustrated in FIG. 3 as computer 110 and may include, but are not limited to, a processing unit 120, a system memory 130, and a system bus 121 that couples various system components, including the system memory, to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus. Computer 110 typically includes a variety of computer-readable media. Computer-readable media can be any available media that can be accessed by computer 110 and include both volatile and nonvolatile media, removable, and nonremovable media. By way of example, and not limitation, computer-readable media may comprise computer storage media and communication media. Computer storage media include both volatile and nonvolatile, removable, and nonremovable media implemented in any method or technology for storage and information such as computer-readable instructions, data structures, program modules, or other data. Computer storage media include, but are not limited to, RAM, ROM, EEPROM, flash memory or other memory technology, CD-ROM, digital versatile disk (DVD), or other optical disk storage, magnetic cassettes, magnetic tape, magnetic disk storage, or other magnetic storage devices, or any other medium that can be used to store the desired information and which can be assessed by computer 110. Communication media typically embody computer-readable instructions, data structures, program modules, or other data in the modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

The system memory 130 includes computer storage media in the form of volatile and/or nonvolatile memory such as read-only memory (ROM) 131 and random-access memory (RAM) 132. A basic input/output system 133 (BIOS), contains basic routines that help to transfer information between elements within computer 110, such as program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/nonremovable, volatile/nonvolatile computer storage media. By way of example only, FIG. 3 illustrates a hard disk drive 140 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as CD-ROM or other optical media. Other removable/nonremovable, volatile/nonvolatile computer storage media that can be used in the exemplary operating environment include, but are not limited to, magnetic tape cassettes, flash memory cards, digital versatile disk, digital videotape, solid state RAM, solid state ROM, and the like. The disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer-readable instructions, data structures, program modules, and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information to the computer through input devices such as a keyboard 162 and pointing device 161, commonly referred to as a mouse, trackball, or touchpad. Other input devices (not shown) may include a microphone, joystick, gamepad, satellite dish, scanner, or the like. These and other input devices are often connected to the processing unit 120 through a user-input interface 160 that is coupled to the system bus, but may be connected by other interface and bus structures, such as a parallel port, game port, or universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

As discussed earlier, one embodiment of the present invention operates in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173 such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary, and other means of establishing a communications link between the computers may be used.

Figure 1:
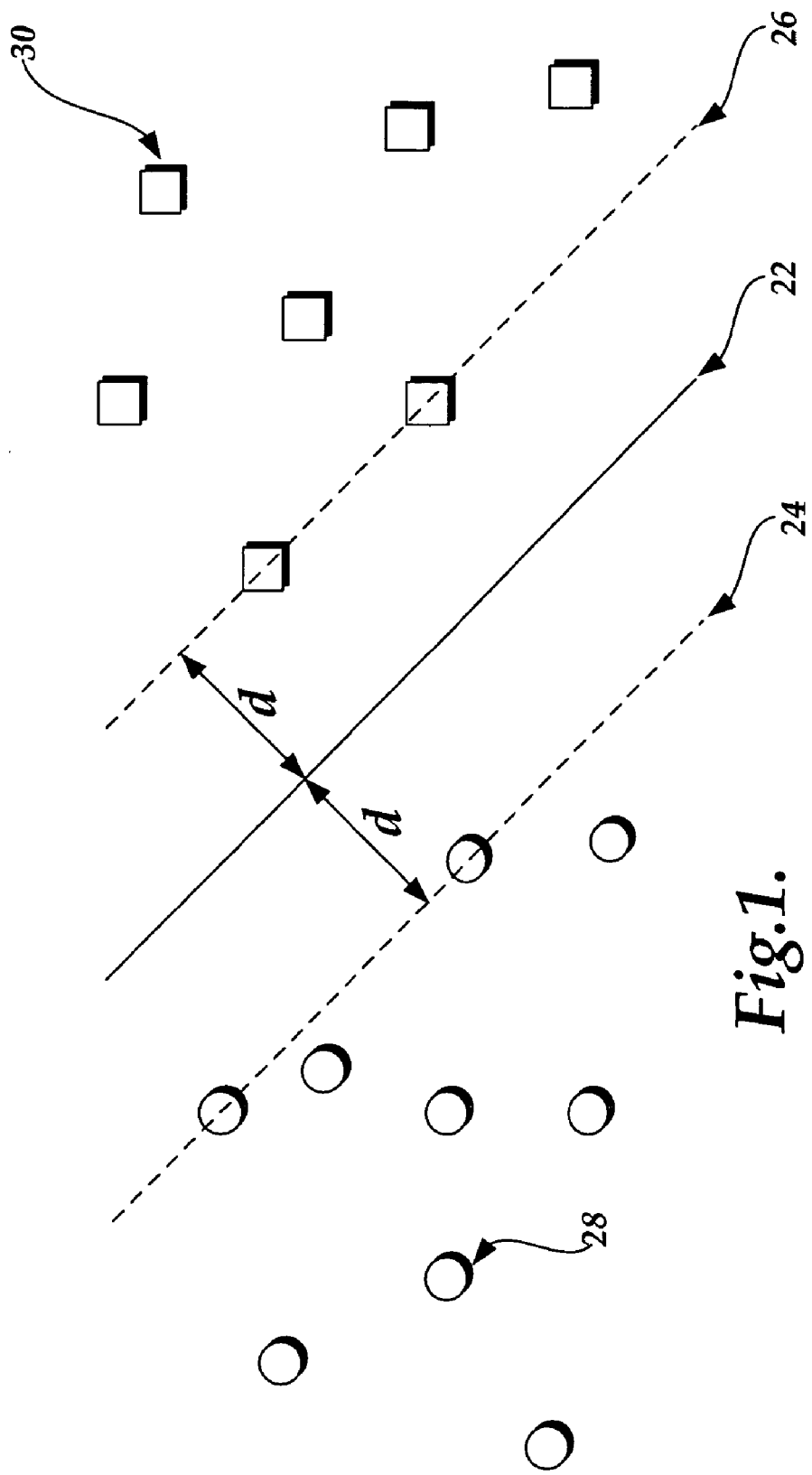
FIG. 1 is a diagram illustrating the general way in which support vector machines classify textual informational objects.

As previously mentioned, an actual embodiment of the present invention uses support vector machines to classify event data into categories. Since support vector machines are well known to those of ordinary skill in the art, only a general discussion for how support vector machines classify textual informational objects is provided. For a more detailed description concerning support vector machines, attention is directed to U.S. patent application Ser. No. 09/102,946, filed Jun. 23, 1998, entitled "Methods and Apparatus For Classifying Text and For Building A Text-.Classifier", by inventors Susan T. Dumais, John C. Platt, David E. Heckerman, and Eric J. Horvitz, commonly assigned, and incorporated herein by this reference. The specific text classifier used in one actual embodiment of the present invention is a linear support vector machine. In its simplest form, a linear support vector machine can be illustrated as a hyperplane 22 that separates a set of "in the class or category" examples, represented by circles 28 in FIG. 1, from a set of "not in the class or category" examples, represented by squares 30 in FIG. 1, by a maximum equi-distance "d" from the hyperplane. Support vector machines work well because they create a text classifier that maximizes the margin between "in the class or category" and "not in the class or category" results of a classification. An actual embodiment of the present invention uses a linear support vector machine for several reasons. The accuracy of simple linear support vector machines is high. In addition, linear support vector machines are simple and efficiently trained. Further, classification of new items into categories is very fast. Another reason for using linear support vector machines is that good results can be achieved using events requiring support data represented as binary vectors of words.

Figure 4:
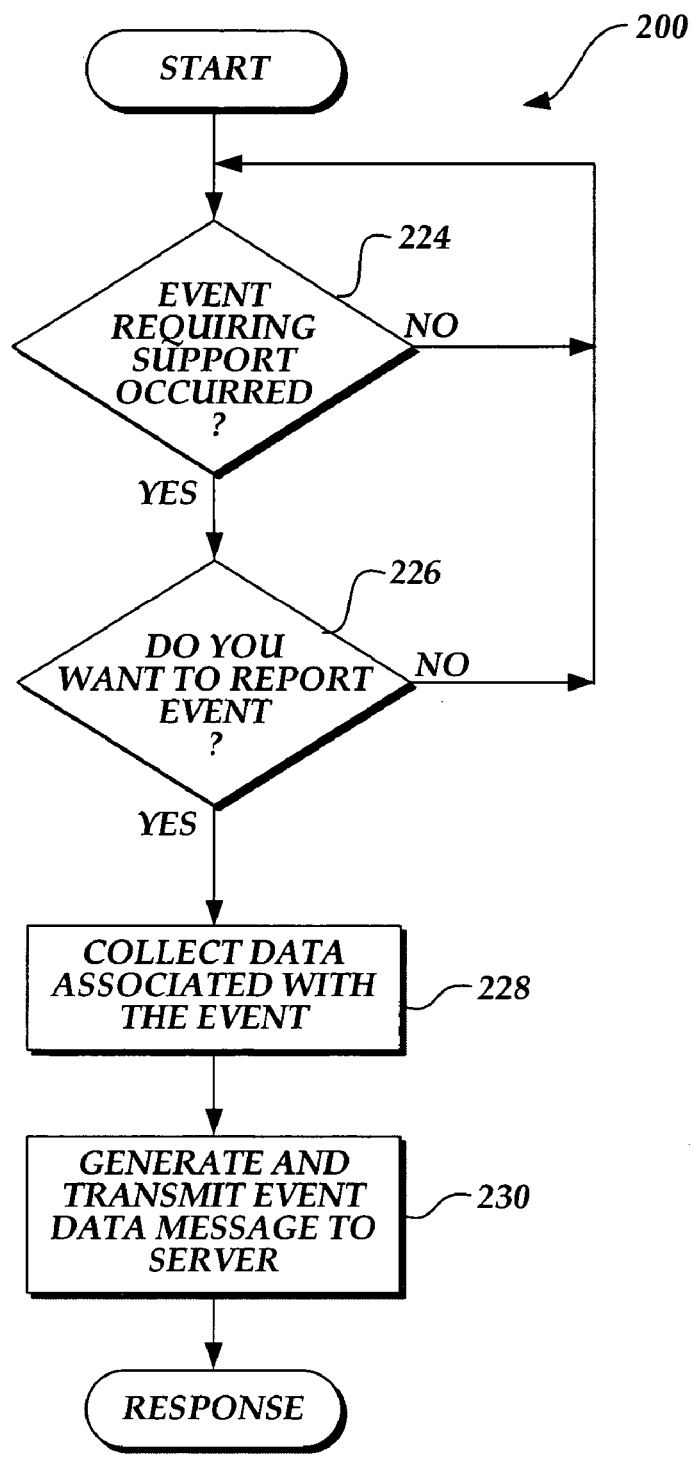
FIG. 4 is a flow diagram illustrating the process performed on a client for recognizing, collecting, and transmitting data associated with the event requiring support to a server, in accordance with an actual embodiment of the present invention.
Figure 5:
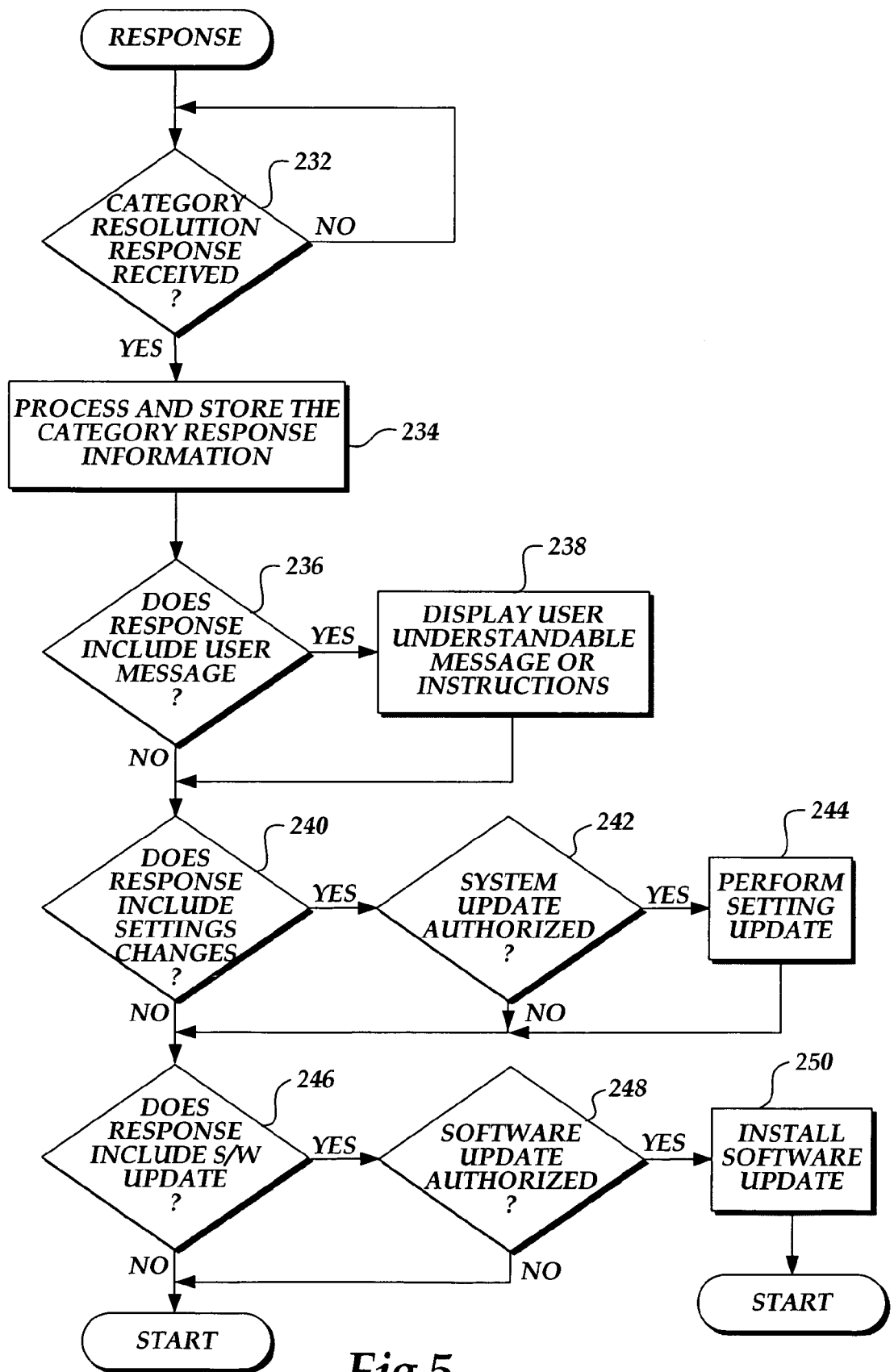
FIG. 5 is a flow diagram illustrating the process performed on a client for receiving the response containing resolution information based on the identified matching category from the server and for providing support to a user at the client, in accordance with an actual embodiment of the present invention.

FIGS. 4 and 5 illustrate a routine 200 for performing the method of the invention at a client, i.e., the computer or other device through which electronic support and assistance are being provided. Preferably, an agent residing on the client carries out the steps of the method illustrated in FIGS. 4 and 5. The agent can be a stand-alone agent, or, preferably, included in the computer's operating system. The agent monitors the client for events requiring support. As discussed previously, where the agent is part of the operating system, the recognizable support events include an error message, a kernel mode fault, a device error, a user mode application fault, an application incompatibility, access denied to file/share/directories, a spontaneous reboot, an abnormal shutdown, a logon failure, a hung application, low resources, a defragmentation error, a disk check error, an application installation failure, and low disk space.

Figure 6:
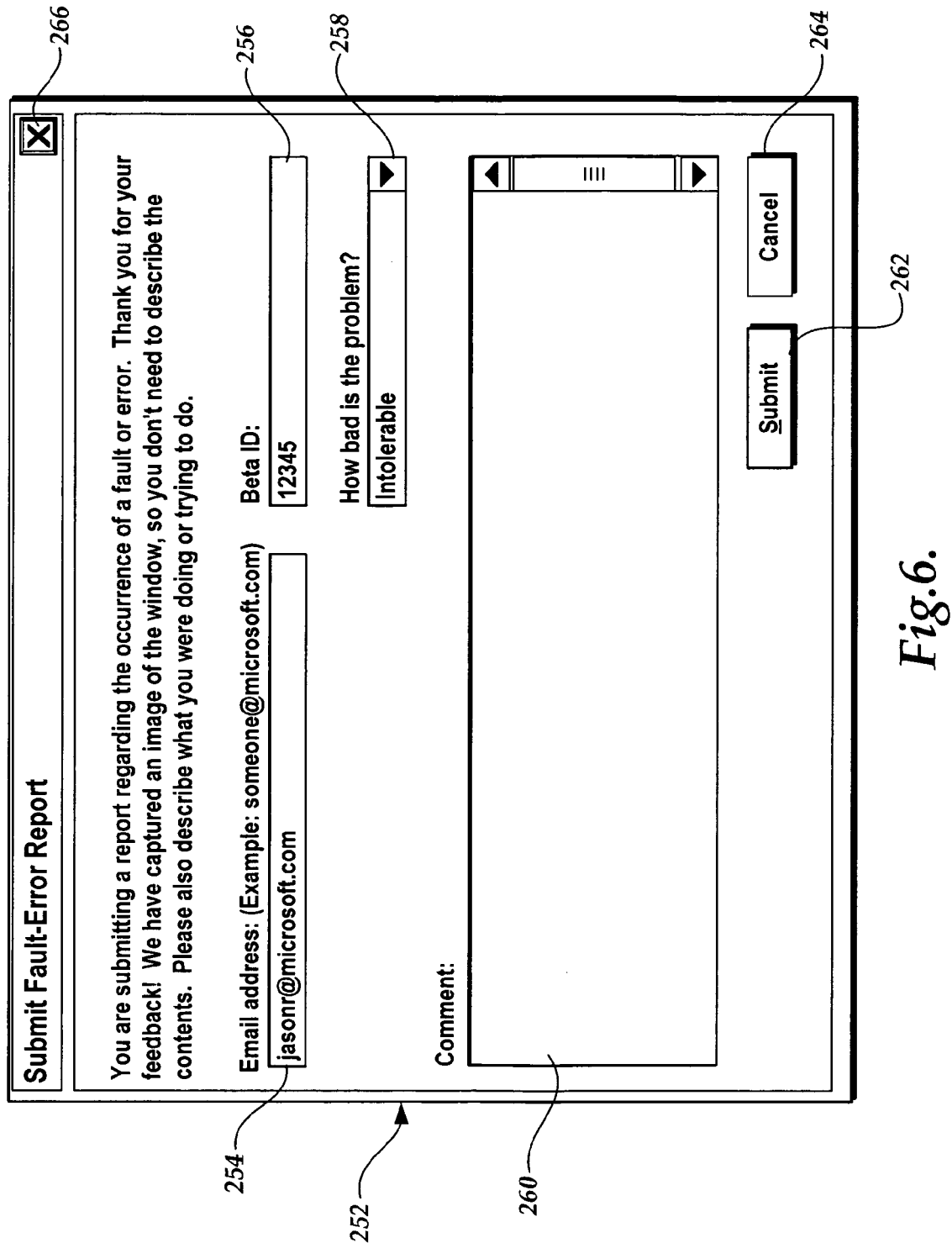
FIG. 6 is a representative screen display of a dialog box requesting a user's authorization to submit a report of an event requiring support to a server from a client, according to an actual embodiment of the present invention.

FIG. 4 illustrates the process performed on the client for recognizing, collecting, and transmitting data associated with the event requiring support to the server. The routine 200 illustrated in FIG. 4 begins at block 224, where a test is made to determine if an event requiring support has occurred. If an event requiring support has occurred, the routine 200 cycles to decision block 226, where a test is made to determine if the user wishes to report, and thus submit, the event requiring support to the server for assistance. In accordance with one embodiment of the present invention, when authorizing submission of the event, the user may also authorize that support for the event be automatically applied. Preferably, the determination is made by presenting the user with a dialog box that queries the user to report the event requiring support by selecting a submit button. A representative screen display of a suitable dialog window 252 is illustrated in FIG. 6. As shown, the representative dialog window 252 includes an e-mail address box 254, a program identification (ID) box 256, a level of tolerance box 258 that includes a drop-down menu (not shown), and a comments box 260. The representative dialog window 252 also includes submit and cancel keys 262 and 264, and a close key 266. According to one embodiment of the present invention, the dialog box also contains an automatic support box for the user to authorize automatically applying support for the event. One skilled in the relevant art will recognize that a variety of information may be obtained from the user in accordance with the present invention.

As an alternative to presenting the user with a dialog box each time an event requiring assistance occurs, the user may preset or configure the client to automatically report all or selective events requiring support. Such embodiments of the invention automatically, upon occurrence, report the selected events requiring support.

After the user authorizes reporting the event requiring support or the report automatically occurs, the routine 200 proceeds to block 228. At block 228, data associated with the event requiring support is collected by the agent. Preferably, the agent creates a minidump using extensible markup language ("XML") instructions. XML is a condensed form of Standard Generalized Markup Language ("SGML") and lets Web developers and designers create customized tags that offer greater flexibility in organizing and presenting information than is possible with the older hypertext markup language ("HTML") document coding system. Alternatively, a dynamic-link library (DLL) may be called by the client agent to collect the event requiring support data and upload the collected data to the server. A dynamic-link library is a feature of the Microsoft Windows family of operating systems and OS/2 that allows executable routines to be stored separately as files with DLL extensions and loaded only when needed by a program. A dynamic-link library has several advantages. First, a dynamic link library does not consume any memory until it is used. Second, because a dynamic-link library is a separate file, a programmer can make corrections or improvements to one dynamic link library without affecting the operation of the calling program or any other dynamic-link libraries. Finally, for the same reason, a programmer can selectively use a chosen dynamic-link library with other programs.

From block 228, the routine 200 continues to block 230, where a message containing the data associated with the event requiring support is generated and transmitted to the server computer. Preferably, the message is an XML file that is compressed when uploaded to the server. Alternatively, the operating system may have its own upload module or engine that transmits the event requiring support data to the server via a connection to the Internet. The routine 200 cycles to block 232 shown in FIG. 5. If no event requiring reporting occurred (block 224) or if the user did not authorize reporting the event (or the event is not automatically reported) (block 226), the routine 200 cycles to the input of decision block 224 shown in FIG. 4 and remains in this loop until an event requiring support occurs and the user authorizes reporting the event.

FIG. 5 illustrates the process performed on the client for receiving a response containing resolution information from the server and providing support to the user at the client. Referring to FIG. 5 at decision block 232, a test is made to determine if a category-specific resolution response has been received from the server. The response contains resolution information based on the classification of event data into categories that exceed a threshold match requirement, which is performed on the server and explained in greater detail below with reference to FIGS. 7 and 8. If a category resolution response was received, the routine 200 proceeds to block 234. At block 234, the category response is processed and stored in a database. From block 234, the routine 200 cycles to block 236.

At decision block 236, a test is conducted to determine whether the response includes a message or instruction for the user at the client. If the response includes a message or instruction for the user, the routine 200 cycles to block 238. At block 238, the message and/or instructions are displayed to the user in terms the user can easily understand. The routine 200 cycles to decision block 240. If it was determined at decision block 236 that no messages or instructions were included in the response, the routine 200 cycles to decision block 240.

At decision block 240 a test is performed to determine whether the response includes changing the system settings. If the response includes a change to the system settings, the routine 200 cycles to decision block 242. At decision block 242 a test is made to determine whether the user has authorized updating the system settings. If system updates are authorized, the routine 200 cycles to block 244. At block 244, the system settings are updated with the changes included in the response and the routine 200 cycles to decision block 246. If it was determined that no changes to the system settings were included in the response (block 240) or that system updates were not authorized (block 242) the routine 200 cycles to decision block 246.

At decision block 246 a test is performed to determine whether the response includes a software update. If the response includes a software update, the routine 200 cycles to decision block 248. At decision block 248 a test is made to determine whether the user has authorized updating the software. If the software updates are authorized, the routine 200 cycles to block 250. At block 250, the software is updated and the routine 200 cycles back to block 224 shown in FIG. 4 and the foregoing steps are repeated. If it was determined that no software updates were included in the response (block 246) or that software updates were not authorized (block 248) the routine 200 cycles back to block 224 shown in FIG. 4 and the foregoing steps are repeated.

Thus, the present invention closes the loop and provides the user with electronic support and assistance from the server, in direct response to and in complete relevance to the event requiring support reported by the user, without the user having to call a help desk or product support. The electronic support and assistance provided by the present invention to the user are provided in a flexible manner to best suit the user's requirements. Those skilled in the relevant art will readily understand that various means of providing the support and assistance may be practiced by the present invention. In accordance with the present invention, different embodiments provide the electronic support and assistance in various ways. For instance, according to one embodiment of the present invention, the support is provided by displaying a message on the video screen of the client computer monitor. In accordance with another embodiment of the present invention, the support is provided by electronic mail. In yet another embodiment of the present invention the support includes directing the user to an address of a resource on the Internet. When appropriate, the Internet resource may contain a fix to be applied by the user. Alternatively, the electronic support and assistance can be provided automatically by applying a fix when authorized by the user.

After providing the electronic support and assistance, the routine 200 cycles to block 224 shown in FIG. 4, and the foregoing steps are repeated. If a category resolution response was not received (block 232), the routine 200 cycles to the input of decision block 232 shown in FIG. 5 and remains in this loop until a category resolution response is received.

Figure 7:
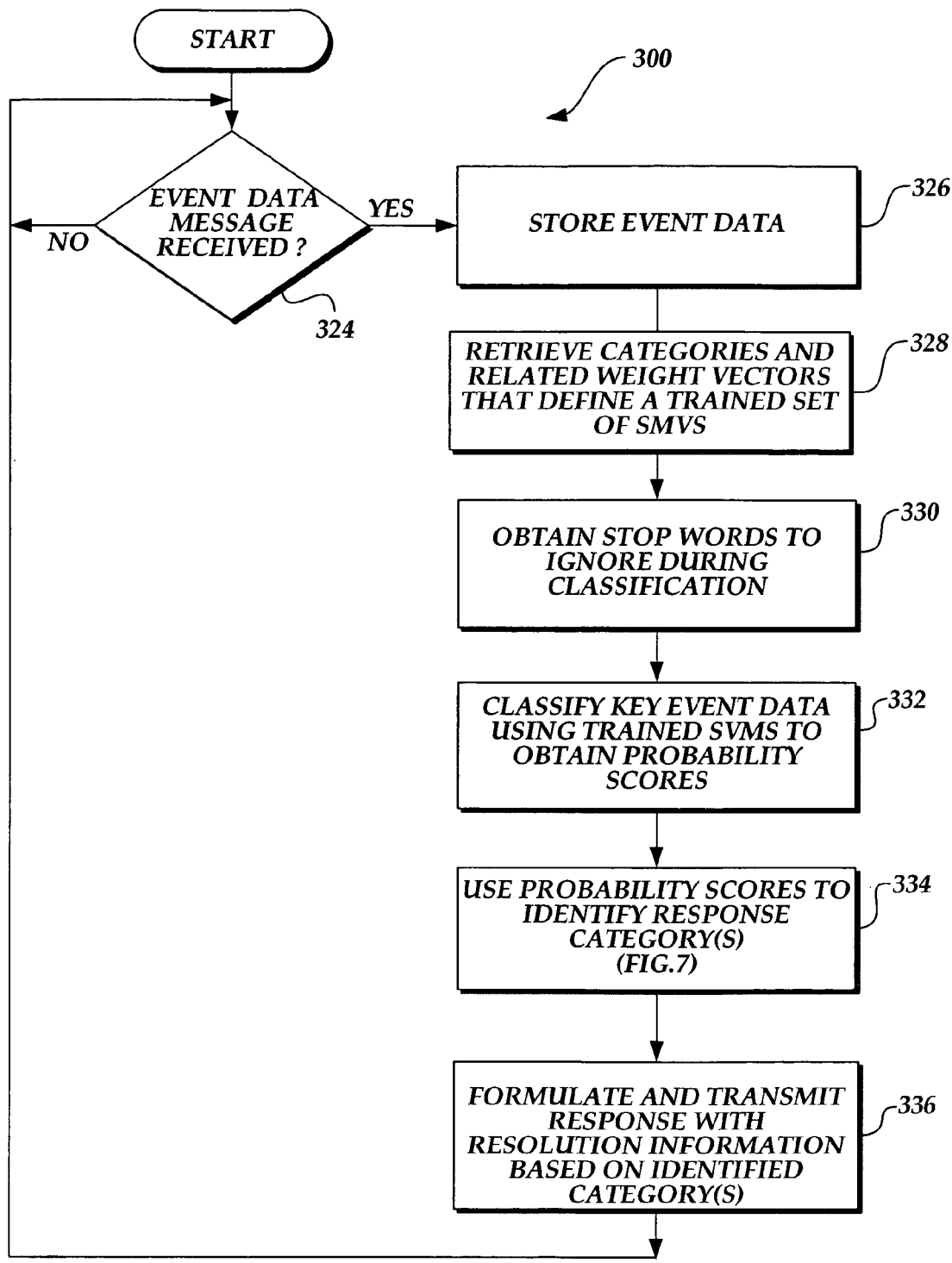
FIG. 7 is a flow diagram illustrating a routine operating on a server, for matching incoming event data with categories that the event data is likely to fall within, according to an actual embodiment of the present invention.

FIG. 7 illustrates a routine 300 for performing the method of the invention at the server. This routine 300 begins at decision block 324, where a test is made to determine if a message containing data associated with an event requiring support has been received from the client computer, i.e., if an event data message is received. Preferably, the determination at decision block 324 is accomplished by monitoring the file directory for the addition of an XML file. If at decision block 324, it is determined that an event data message has been received from a client, the routine 300 proceeds to block 326. At block 326, the event data is saved. As discussed above with respect to FIG. 2, and in accordance with one embodiment of the present invention, the event data is written to a hierarchical database and in another embodiment the event data is written to an object-oriented database.

After storing the event data, the routine 300 cycles to block 328 where the categories and associated weight vectors that define a trained set of support vector machines are retrieved. In one actual embodiment of the present invention, the categories and their weight vectors are retrieved from a Channel Definition Format ("CDF") file. After retrieving the categories and their weight vectors, the routine 300 cycles to block 330 where a list of stop words is retrieved. Stop words are words that are to be ignored during classification processing by the support vector machines.

After retrieving the stop words, the routine 300 proceeds to block 332 where the key event data, i.e., the event data minus the stop words, is classified into categories using the retrieved trained set of support vector machines. As part of classifying the key event data into categories, the trained set of support vector machines produces probability scores for each category.

Figure 8:
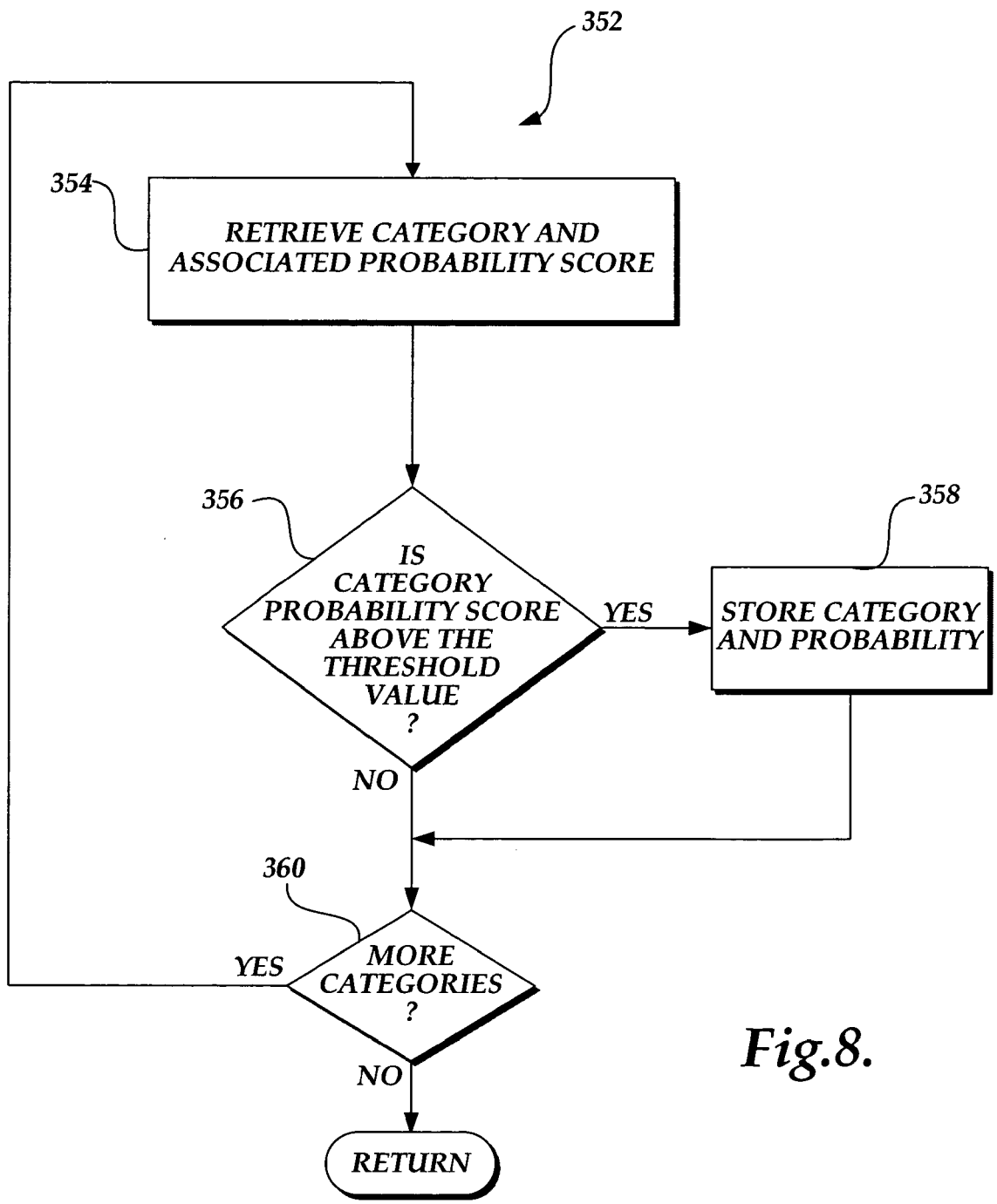
FIG. 8 is a flow diagram illustrating a subroutine operating on a server for identifying the one or more matching categories, if any, that the data associated with an event requiring support falls into, according to an actual embodiment of the present invention.

After the trained set of support vector machines has categorized the key event data and produced the category probabilities, the routine 300 cycles to block 334. At block 334, the routine 300 uses the probability scores produced by the trained set of support vector machines to identify any category whose associated probability score is sufficiently high to be the likely cause of the event that triggered the original event data message 334 to be generated. How this is accomplished is illustrated in FIG. 8 and described below. After determining if any category is sufficiently high, the routine 300 cycles to block 336. At block 336, a response containing resolution information based on the identified matching category, if any, is formulated and transmitted. According to one embodiment of the present invention, the response includes the probability scores associated with the identified matching categories. If more than one category exists, the category-specific resolution information contained in the response may be prioritized and listed in order of highest to lowest probability. Or, only the resolution information for the highest probability category may be contained in the response formulated. In any case, after formulation, the category resolution response is transmitted to the client. After the category resolution response has been transmitted to the client, the routine 300 cycles to block 324, and the method steps of the routine 300 are repeated. If at decision block 324, a determination is made that no message containing an event requiring support data has been received from the client, the routine 300 cycles to the input of decision block 324 and remains in this loop until an event data message is received.

FIG. 8 illustrates a subroutine 352 performed by the server to determine return message categories, if any, based on the probability scores. The subroutine 352 begins at block 354 where the first category and its associated probability score determined by the trained set of support vector machines (block 334, FIG. 7), are retrieved. After retrieving the category and probability data, the subroutine 352 proceeds to decision block 356. At decision block 356, a test is made to determine if the category probability score is above a preset threshold value. If the category probability score exceeds the threshold value, the event requiring support is considered to fall within the category. If the category probability score exceeds the threshold value, the subroutine 352 proceeds to block 358. At block 358, the category and probability score are stored. After storing the category and probability score, the processing cycles to decision block 360. If it is determined at decision block 356 that the probability score does not exceed the preset threshold value, the processing also cycles to decision block 360.

At decision block 360, a test is made to determine if more categories remain to be processed. If more categories remain to be processed, the subroutine 352 returns to block 354 where the next category and its associated probability score are retrieved. Blocks 354, 356, 358, and 360 are repeated until all categories have been processed, at which point subroutine 352 returns to block 334 shown in FIG. 7.

While the presently preferred embodiment of the invention has been illustrated and described above, it will be appreciated that various changes can be made therein without departing from the spirit and scope of the invention as defined by the appended claims.

The invention claimed is:

1. A method of providing electronic support from a server to a client comprising:
at the client:
   (a) monitoring the client for events requiring support;
   (b) upon the occurrence of an event requiring support, obtaining user authority to transmit data associated with the event requiring support to the server;
   (c) gathering data associated with the event requiring support;
   (d) generating a message containing the event data; and
   (e) transmitting the message to the server;
at the server:
   (f) receiving the event data from the client;
   (g) extracting the event data from the message;
   (h) applying the event data to support vector machines to obtain probability scores;
   (i) using the probability scores to identify which, if any, categories are probable causes of the event requiring support;
   (j) formulating a response containing resolution information based on the category or categories, if any, that were identified as probable causes of the event requiring support; and
   (k) transmitting the response to the client; and
at the client:
   (l) receiving the response formulated by the server; and
   (m) providing support based on the response from the server.

2. The method of claim 1, wherein the events requiring support are selected from the group of events consisting of:
   (a) an error message,
   (b) a kernel mode fault,
   (c) a device error,
   (d) a user mode application fault,
   (e) an application incompatibility,
   (f) an access denied to file/share/directory,
   (g) a spontaneous reboot,
   (h) an abnormal shutdown,
   (i) a logon failure,
   (j) a hung application,
   (k) low resources,
   (l) a defragmentation error,
   (m) a disk check error,
   (n) an application installation failure, and
   (o) low disk space.

3. The method of claim 1, wherein a category is identified as a probable cause of the event requiring support when the probability score of the category is above a threshold value.

4. The method of claim 1, wherein obtaining user authority to transmit data associated with the event requiring support further includes obtaining user authority to apply the support automatically.

5. The method of claim 1, wherein the response includes user-understandable instructions.

6. The method of claim 1, wherein the response includes a software update.

7. The method of claim 1, wherein the response includes a change to the system settings.

8. The method of claim 1, wherein the support is applied automatically when authorized by the user.

9. A computer-readable storage medium containing computer-readable storage instructions that, when executed by a computer, perform the method of claim 1.

10. A method of providing electronic support from a server to a client comprising at the client:
   (a) monitoring the client for events requiring support;
   (b) upon the occurrence of an event requiring support, obtaining user authority to transmit data associated with the event requiring support to the server,
   (c) gathering data associated with the event requiring support;
   (d) generating a message containing the event data;
   (e) transmitting the message to the server;
   (f) receiving a response formulated by a server responding to the event data transmitted to the server; and
   (g) providing support based on the response.

11. The method of claim 10, wherein the events requiring support are selected from the group of events consisting:
   (a) an error message,
   (b) a kernel mode fault,
   (c) a device error,
   (d) a user mode application fault,
   (e) an application compatibility issue,
   (f) an access denied to file/share/directory,
   (g) a spontaneous reboot,
   (h) an abnormal shutdown,
   (i) a logon failure,
   (j) a hung application,
   (k) low resources,
   (l) a defragmentation error,
   (m) a disk check error,
   (n) an application installation failure, and
   (o) low disk space.

12. A computer-readable storage medium containing computer-readable storage instructions that, when executed by a computer, perform the method of claim 11.

13. The method of claim 10, wherein the support includes user-understandable instructions.

14. A computer-readable storage medium containing computer-readable storage instructions that, when executed by a computer, perform the method of claim 13.

15. The method of claim 10, wherein the support includes a software update.

16. A computer-readable storage medium containing computer-readable storage instructions that, when executed by a computer, perform the method of claim 15.

17. The method of claim 10, wherein the support includes a change to the system settings.

18. A computer-readable storage medium containing computer-readable storage instructions that, when executed by a computer, perform the method of claim 17.

19. The method of claim 10, wherein the response includes instructions directing the user to an address of a resource on the Internet.

20. The method of claim 10, wherein the support provided is prioritized in order of highest to lowest probability of causing the event requiring support.

21. The method of claim 10, wherein the support is provided using a video display device at the client.

22. The method of claim 10, wherein the response is received by electronic mail.

23. The method of claim 10, wherein obtaining user authority to transmit data associated with the event requiring support further includes obtaining user authority to apply the support automatically.

24. A computer-readable storage medium containing computer-readable storage instructions that, when executed by a computer, perform the method of claim 23.

25. The method of claim 10, wherein the support is applied automatically when authorized by the user.

26. A computer-readable storage medium containing computer-readable storage instructions that, when executed by a computer, perform the method of claim 10.

27. A method of providing electronic support from a server to a client machine comprising at the server:
 (a) receiving the message from the client containing event data;
 (b) extracting the event data from the message;
 (c) applying the event data to support vector machines to obtain probability scores;
 (d) using the probability scores to identify which, if any, categories are probable causes of the event data received from the client;
 (e) formulating a response containing resolution information based on the category or categories, if any, that were identified as probable causes of the event data received from the client; and
 (f) sending the response to the client.

28. The method of claim 27, wherein a category is identified as a probable cause of the event requiring support when the probability score of the category is above a threshold value.

29. A computer-readable storage medium containing computer-readable storage instructions that, when executed by a computer, perform the method of claim 28.

30. The method of claim 27, wherein a category is identified as a probable cause of the event requiring support when the probability score of the category is above one of a plurality of threshold values.

31. A computer-readable storage medium containing computer-readable storage instructions that, when executed by a computer, perform the method of claim 30.

32. The method of claim 27, wherein formulating the response includes prioritizing categories in order of highest to lowest probability of causing the event requiring support.

33. A computer-readable storage medium containing computer-readable storage instructions that, when executed by a computer, perform the method of claim 32.

34. The method of claim 27, wherein the event data is related to an event selected from the group of events consisting:
 (a) an error message,
 (b) a kernel mode fault,
 (c) a device error,
 (d) a user mode application fault,
 (e) an application compatibility issue,
 (f) an access denied to file/share/directory,
 (g) a spontaneous reboot,
 (h) an abnormal shutdown,
 (i) a logon failure,
 (j) a hung application,
 (k) low resources,
 (l) a defragmentation error,
 (m) a disk check error,
 (n) an application installation failure, and
 (o) low disk space.

35. The method of claim 27, wherein the response includes user-understandable instructions.

36. The method of claim 27, wherein the response includes a software update.

37. The method of claim 27, wherein the response includes a change to the system settings.

38. The method of claim 27, wherein the response is transmitted by electronic mail.

39. The method of claim 27, wherein the response includes instructions directing the user to an address of a resource on the Internet.

40. A computer-readable storage medium containing computer-readable storage instructions that, when executed by a computer, perform the method of claim 27.

* * * * *